US012617269B2

(12) United States Patent
Yamazaki et al.

(10) Patent No.: US 12,617,269 B2
(45) Date of Patent: May 5, 2026

(54) WORKING VEHICLE

(71) Applicant: KUBOTA CORPORATION, Osaka (JP)

(72) Inventors: Asuka Yamazaki, Osaka (JP); Kazuki Matsumoto, Osaka (JP); Shunya Kiyokawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/120,415

(22) PCT Filed: Jul. 28, 2023

(86) PCT No.: PCT/JP2023/027773
§ 371 (c)(1),
(2) Date: Apr. 11, 2025

(87) PCT Pub. No.: WO2024/095547
PCT Pub. Date: May 10, 2024

(65) Prior Publication Data
US 2026/0034878 A1      Feb. 5, 2026

(30) Foreign Application Priority Data

Oct. 31, 2022     (JP) ................................. 2022-173894

(51) Int. Cl.
B60K 17/24          (2006.01)
B60G 9/02          (2006.01)
(52) U.S. Cl.
CPC ................ B60K 17/24 (2013.01); B60G 9/02 (2013.01); B60Y 2200/221 (2013.01)

(58) Field of Classification Search
CPC ..... B60K 17/24; B60G 9/02; B60Y 2200/221
(Continued)

(56) References Cited

U.S. PATENT DOCUMENTS 4,785,626 A      11/1988   Shiraishi
6,755,269 B1 *    6/2004   Davis ..................... B62D 63/00
180/291

(Continued)

FOREIGN PATENT DOCUMENTS

JP          63-110091          5/1988
JP          3-88911          4/1991
(Continued)

OTHER PUBLICATIONS

Written Opinion with International Search Report, dated Oct. 10, 2023, issued in International Bureau of WIPO Patent Application No. PCT/JP2023/027773 with English translation thereof.
(Continued)

*Primary Examiner* — Toan C To
(74) *Attorney, Agent, or Firm* — GREENBLUM & BERNSTEIN, P.L.C.

(57)          ABSTRACT
A working vehicle includes a machine body frame to which an engine is fixed, a front axle case that supports an axle of a front wheel and is rockable about a rocking shaft, a suspension device that absorbs vibration transmitted from the front axle case to the machine body frame, and a support member that is fixed to the machine body frame so as to be located below the engine, supports the rocking shaft, and defines a routing space in which a linear member (first hose, second hose extending in a front-rear direction can be routed between the support member and the engine.

18 Claims, 12 Drawing Sheets

(58) Field of Classification Search
USPC ...................................... 280/85, 86.5, 124.11
See application file for complete search history.

(56) References Cited

U.S. PATENT DOCUMENTS

| | | | | |
|---|---|---|---|---|
| 7,758,058 B2 * | 7/2010 | Bordini | ................ | A01B 69/006 |
| | | | | 280/771 |
| 2005/0189730 A1 * | 9/2005 | White | ..................... | B60G 9/02 |
| | | | | 280/6.154 |
| 2007/0062480 A1 | 3/2007 | Tanaka et al. | | |
| 2011/0148053 A1 * | 6/2011 | Motebennur | ...... | B62D 49/0607 |
| | | | | 280/6.16 |
| 2017/0217473 A1 * | 8/2017 | Higashiguchi | ............ | B62C 1/08 |
| 2020/0307334 A1 * | 10/2020 | Calago | ..................... | B60G 9/02 |
| 2021/0122224 A1 * | 4/2021 | Bender | ................... | B60K 5/04 |

FOREIGN PATENT DOCUMENTS

| | | |
|---|---|---|
| JP | 5-38957 | 2/1993 |
| JP | 5-65033 | 3/1993 |
| JP | 6-108841 | 4/1994 |
| JP | 3155738 | 4/2001 |
| JP | 2007-077925 | 3/2007 |
| JP | 2009-298227 A | 12/2009 |
| JP | 2011-131744 | 7/2011 |
| JP | 2018-192950 | 12/2018 |
| JP | 2022-11341 A | 1/2022 |

OTHER PUBLICATIONS

Office Action issued in JP Patent Application No. 2022-173894, Nov. 4, 2025, machine translation.

* cited by examiner

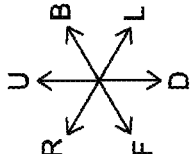
Fig. 5
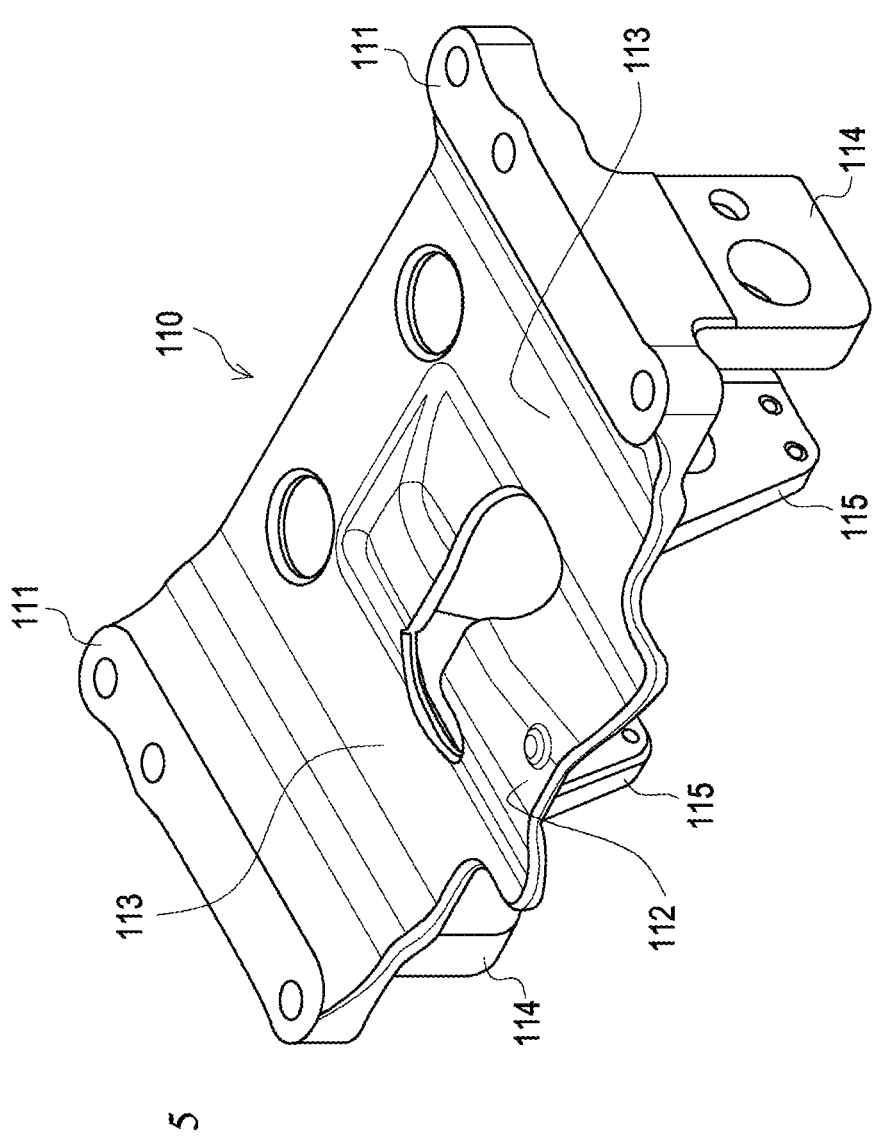

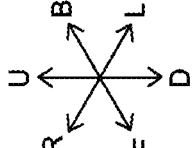
Fig. 6
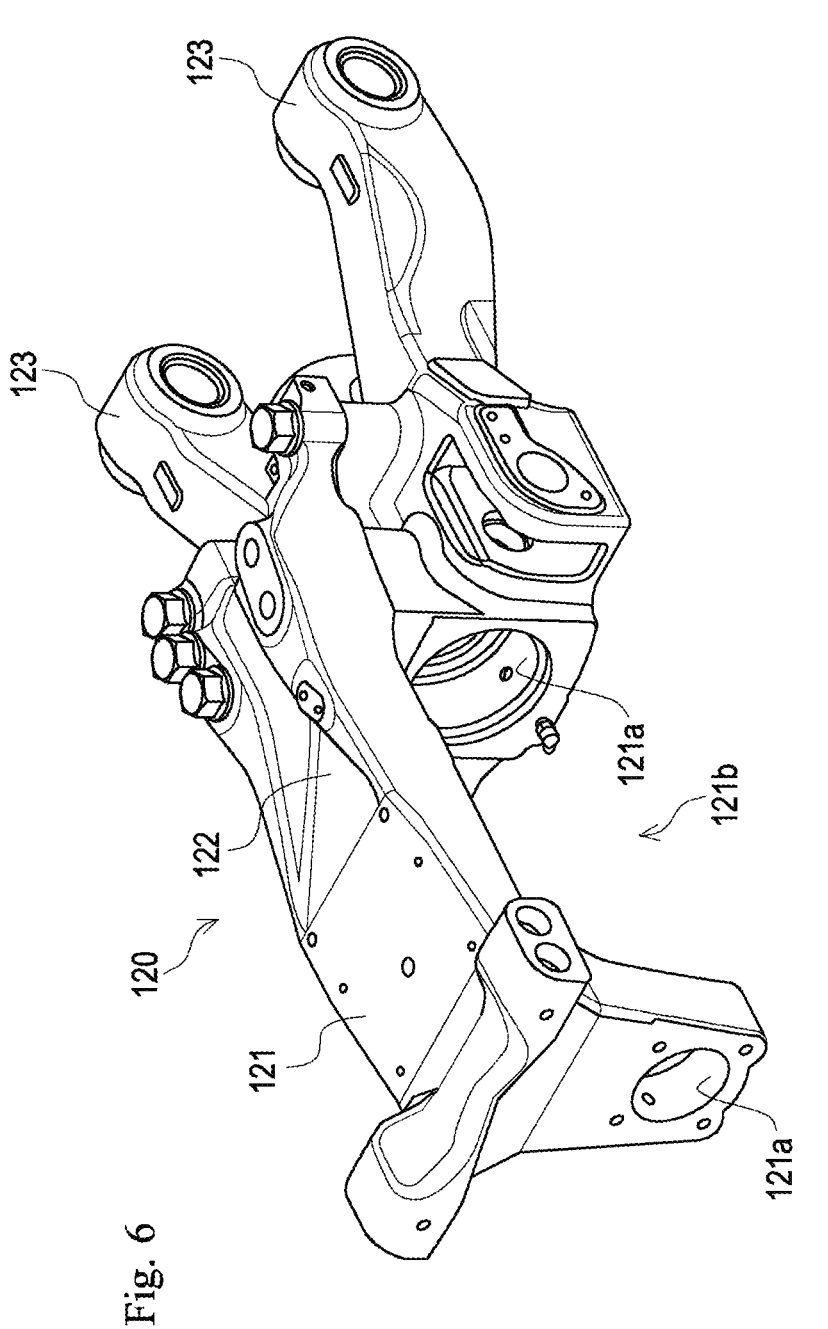

WORKING VEHICLE

TECHNICAL FIELD

The present invention relates to a technique of a working vehicle.

BACKGROUND ART

Conventionally, a technique of a working vehicle is known. For example, Patent Literature 1 describes such a technique.

Patent Literature 1 describes a tractor. In the tractor, a driving force of an engine is shifted by a transmission shift device in a transmission case, and is transmitted to an axle in a front axle case through a front wheel drive shaft disposed below a machine body. The front axle case is rockably supported with respect to the machine body by a case rocking support portion (suspension device).

In the tractor as described above, a cylinder using hydraulic pressure may be provided in the suspension device, the front axle case, or the like. In this case, it is required to suitably route a linear member such as a hose for feeding oil to the cylinder.

CITATION LIST

Patent Literature

Patent Literature 1: JP 3155738 B2

SUMMARY OF INVENTION

Technical Problem

One aspect of the present disclosure has been made in view of the above circumstances, and an object of the present disclosure is to provide a working vehicle capable of suitably routing a liner member.

Solution to Problem

The problem to be solved by one aspect of the present disclosure is as described above, and means for solving the problem will be described below.

A working vehicle according to one aspect of the present disclosure includes: a machine body frame to which an engine is fixed; a front axle case that supports an axle of a front wheel and is rockable about a rocking shaft; a buffer device that absorbs vibration transmitted from the front axle case to the machine body frame; and a support member that is fixed to the machine body frame so as to be located below the engine, supports the rocking shaft, and defines a routing space in which a linear member extending in a front-rear direction can be routed between the support member and the engine.

According to one aspect of the present disclosure, the routing of the linear member can be suitably performed.

The engine according to one aspect of the present disclosure includes a recess formed in a lower surface so as to extend in the front-rear direction, and the routing space includes a first routing space defined by the recess and the support member.

According to one aspect of the present disclosure, the linear member can be routed using the recess formed in the lower surface of the engine.

The linear member according to one aspect of the present disclosure includes a first hose connected to a steering cylinder provided in the front axle case from a rear side of the engine, and the first hose is routed in the first routing space.

According to one aspect of the present disclosure, the routing of the first hose can be suitably performed.

The routing space according to one aspect of the present disclosure includes a second routing space defined by a side surface of the engine, an inner surface of the machine body frame facing the side surface, and the support member.

According to one aspect of the present disclosure, the linear member can be routed using the second routing space formed on the side of the engine.

The buffer device according to one aspect of the present disclosure includes a buffer cylinder, the linear member includes a second hose connected to the buffer cylinder from a rear side of the engine, and the second hose is routed in second routing space.

According to one aspect of the present disclosure, the routing of the second hose can be suitably performed.

A working vehicle according to one aspect of the present disclosure further includes a rocking member to which the front axle case is fixed, the rocking member being supported to be rockable about the rocking shaft with respect to the support member, in which the rocking member includes a guide groove portion formed on an upper surface so as to extend in the front-rear direction, the guide groove portion being capable of guiding the linear member.

According to one aspect of the present disclosure, the linear member can be routed using the guide groove portion formed on the upper surface of the rocking member.

In the working vehicle according to one aspect of the present disclosure, a drive transmission shaft that transmits a driving force from the engine to the axle is disposed below the support member.

According to one aspect of the present disclosure, the linear member can be protected.

The working vehicle according to one aspect of the present disclosure further includes a cover portion fixed to the support member and covering the drive transmission shaft from below.

According to one aspect of the present disclosure, the cover portion covering the drive transmission shaft can be fixed using the support member.

Advantageous Effects of Invention

According to one aspect of the present disclosure, an assembling error of a constant velocity joint can be absorbed, and space saving can be achieved.

BRIEF DESCRIPTION OF DRAWINGS

FIG. 5 is a perspective view illustrating a support member.

FIG. 6 is a perspective view illustrating a rocking member.

DESCRIPTION OF EMBODIMENT

Figure 1:
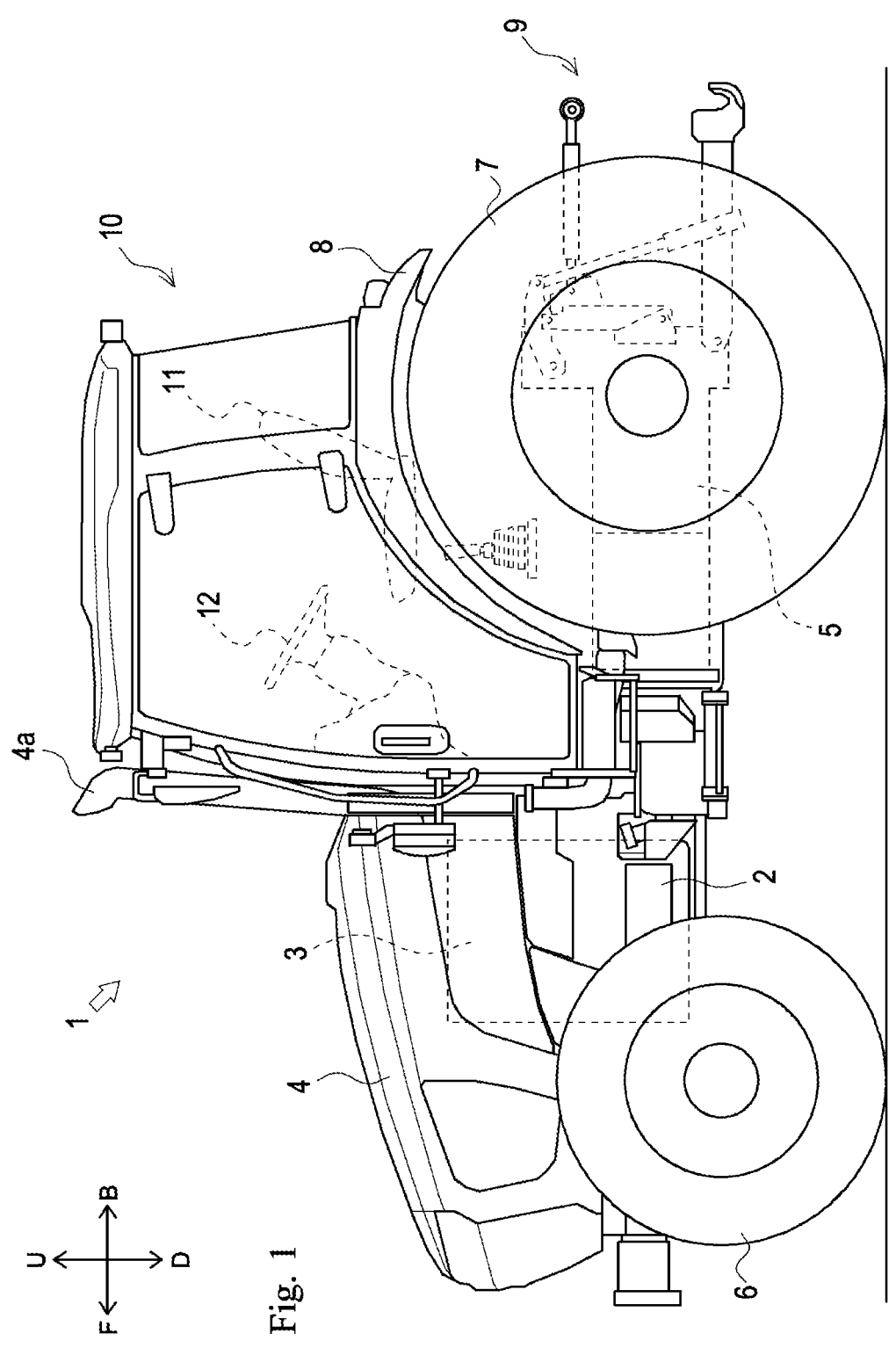
FIG. 1 is a side view illustrating an overall configuration of a tractor according to one aspect of the present disclosure.

In the following description, directions indicated by arrows U, D, F, B, L, and R in the drawings are defined as an upward direction, a downward direction, a forward direction, a backward direction, a left direction, and a right direction, respectively.

First, an overall configuration of a tractor 1 according to an aspect of the present disclosure will be described.

The tractor 1 illustrated in FIG. 1 mainly includes a machine body frame 2, an engine 3, a bonnet 4, a transmission case 5, front wheels 6, rear wheels 7, a fender 8, a lifting device 9, a cabin 10, a front axle case 20, a steering device 30, a suspension device 100, a drive transmission shaft 200, a cover member 300, and the like.

The machine body frame 2 is a frame-shaped member formed by appropriately combining a plurality of panel members. The machine body frame 2 is formed in a substantially rectangular shape in plan view (see FIG. 2). The machine body frame 2 is disposed in a front portion of the tractor 1 with its longitudinal direction oriented in a front-rear direction. The engine 3 is fixed to a rear portion of the machine body frame 2. The engine 3 is covered with the bonnet 4. The transmission case 5 is fixed to a rear portion of the engine 3. A muffler 4a that discharges exhaust gas of the engine 3 is disposed on a right side of the bonnet 4.

An oil pan 3a capable of storing engine oil is provided in a lower portion of the engine 3. On a lower surface of the oil pan 3a (engine 3), a recess 3b extending in the front-rear direction is formed (see FIG. 12).

Figure 2:
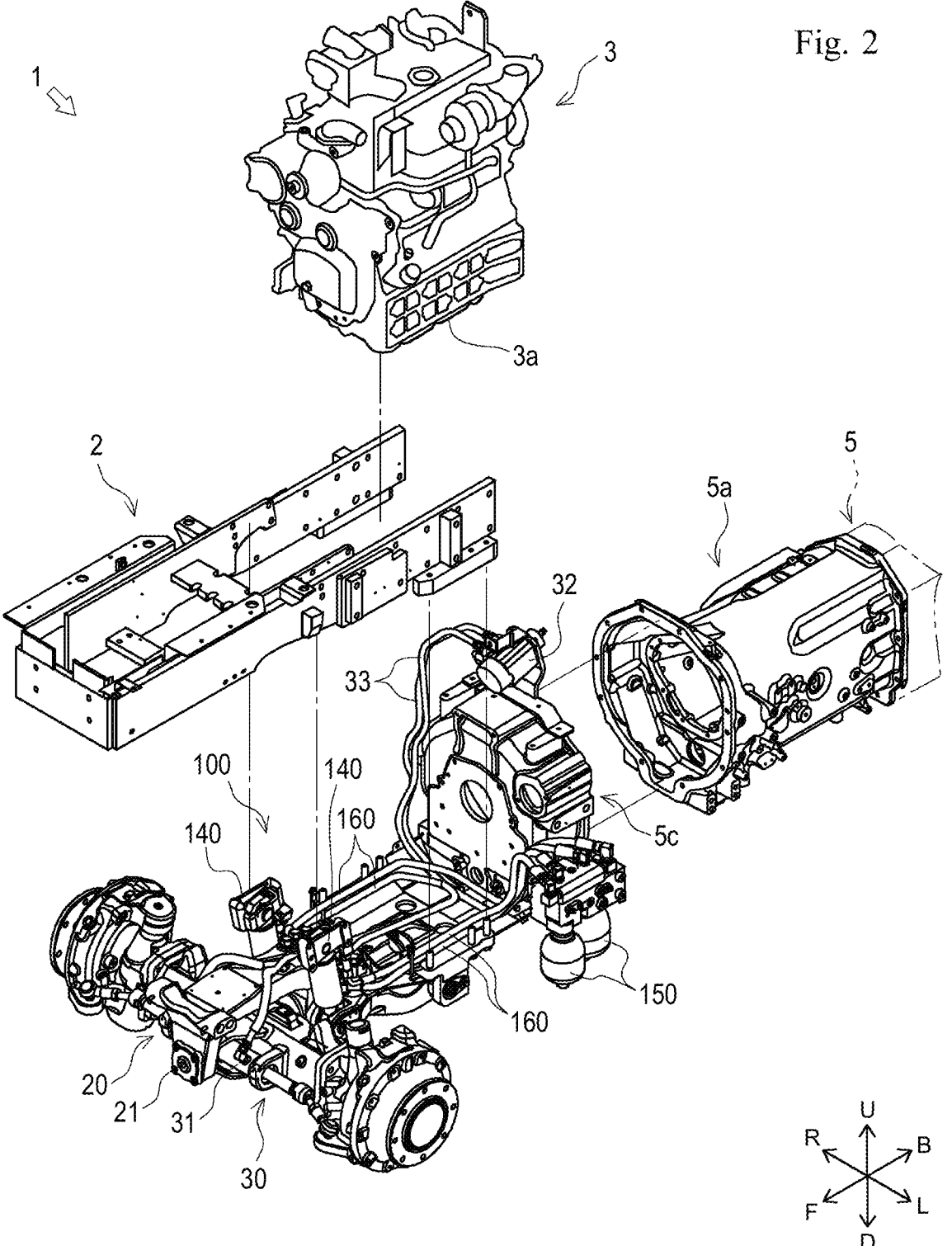
FIG. 2 is an exploded perspective view illustrating a machine body frame, an engine, a transmission case, a clutch housing, a flywheel housing, a front axle case, a steering device, and a suspension device of the tractor.

The transmission case 5 accommodates a power transmission mechanism (not illustrated). As illustrated in FIG. 2, a clutch housing 5a that accommodates the power transmission mechanism (a transmission shift device, a clutch, or the like) (not illustrated) is provided in front of the transmission case 5. A shaft support portion 5b that supports the drive transmission shaft 200 to be described later is provided in a lower portion of the clutch housing 5a (see FIG. 8). Furthermore, a flywheel housing 5c that accommodates a flywheel is provided in front of the clutch housing 5a (between the clutch housing 5a and the engine 3).

A front portion of the machine body frame 2 is supported by a pair of the left and right front wheels 6 through a front axle mechanism (the front axle case 20 to be described later or the like). A rear portion of the transmission case 5 is supported by a pair of the left and right rear wheels 7 through a rear axle mechanism (not illustrated). The pair of left and right rear wheels 7 is covered with the fender 8 from substantially above.

The lifting device 9 is provided at a rear portion of the transmission case 5. Various working devices (for example, a cultivator or the like) can be mounted on the lifting device 9. The lifting device 9 can lift and lower the mounted working device by an actuator such as a hydraulic cylinder.

The power of the engine 3 is shifted in speed by a transmission shift device (not illustrated) or the like accommodated in the clutch housing 5a, and then transmitted to the front axle mechanism by the drive transmission shaft 200, and transmitted to the front wheels 6 via the front axle mechanism. Furthermore, the power shifted by the transmission shift device can be transmitted to the rear wheels 7 via the rear axle mechanism. In this way, the front wheels 6 and the rear wheels 7 are rotationally driven by the power of the engine 3, and the tractor 1 can travel. Furthermore, the working device mounted on the lifting device 9 can be driven by the power of the engine 3.

The cabin 10 is provided behind the engine 3. The cabin 10 is placed on a vehicle body (such as the transmission case 5). Inside the cabin 10, a living space on which a driver boards is formed. A seat 11 on which the driver sits is disposed in the living space. Furthermore, a steering wheel 12 for adjusting a turning angle of the front wheels 6 is disposed in the front portion of the cabin 10.

Figure 3:
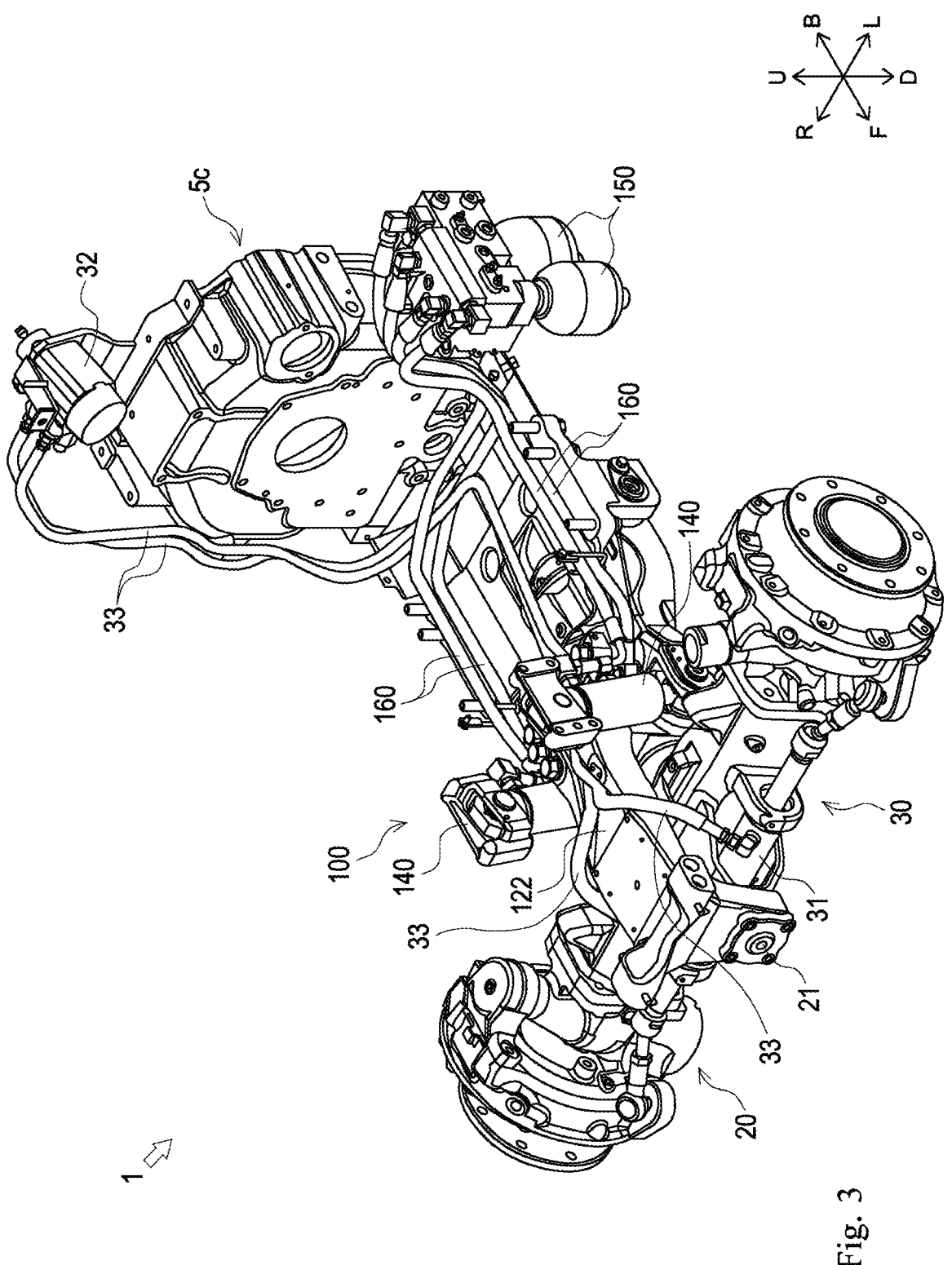
FIG. 3 is a perspective view illustrating the flywheel housing, the front axle case, the steering device, and the suspension device.
Figure 4:
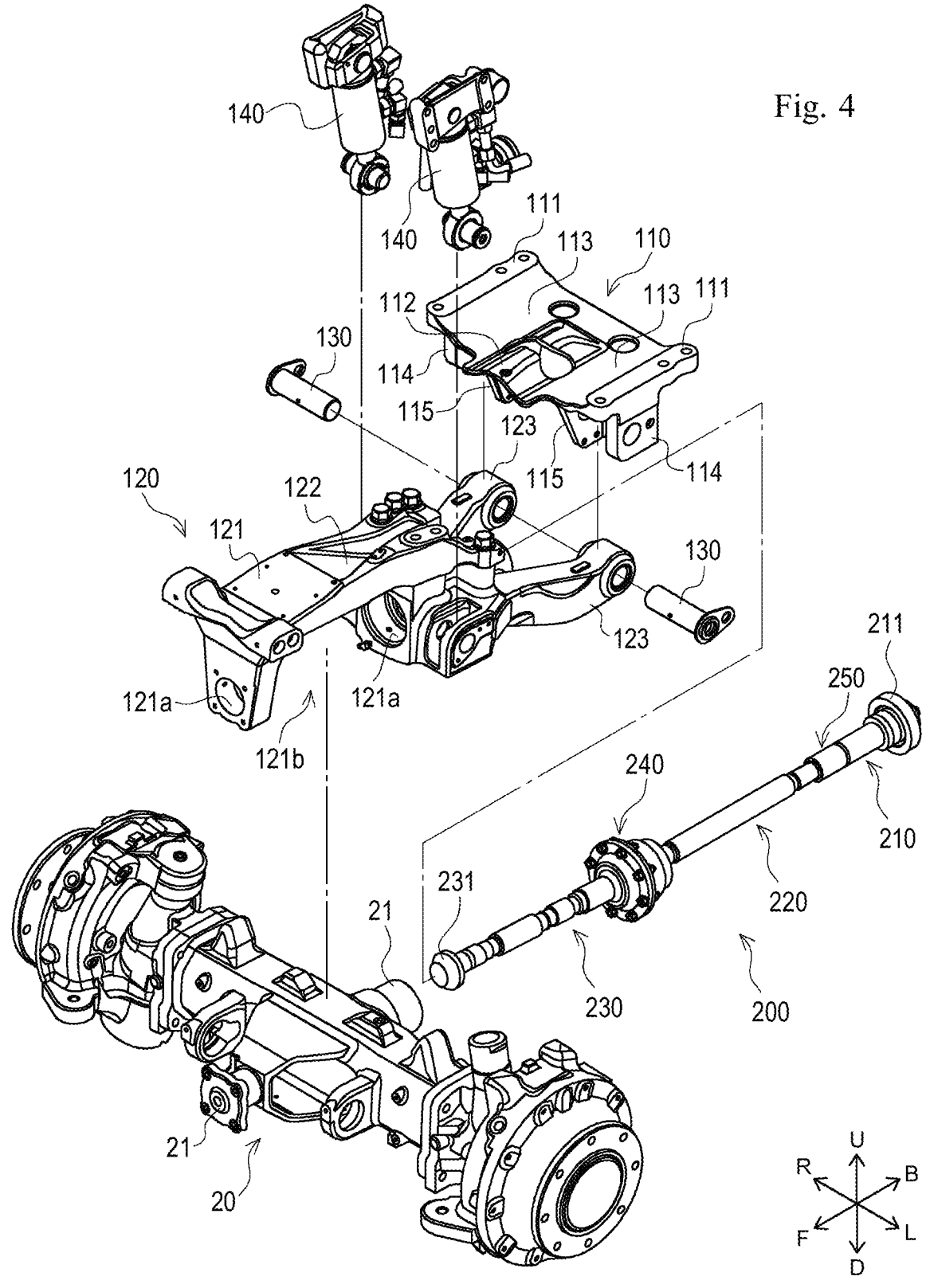
FIG. 4 is an exploded perspective view illustrating the front axle case, the suspension device, and a drive transmission shaft.

The front axle case 20 illustrated in FIGS. 2 to 4 accommodates an axle (not illustrated) of the front wheels 6. The front axle case 20 is disposed below the machine body frame 2. The front axle case 20 is formed in a shape elongated in a left-right direction. The front axle case 20 is formed in a hollow shape, and the axle of the front wheels 6 is disposed in an internal space. The front wheels 6 are provided on both left and right sides of the front axle case 20 through the axle. The front axle case 20 constitutes the front axle mechanism together with a steering cylinder 31 to be described later. The front axle case 20 includes a shaft portion 21.

Figure 8:
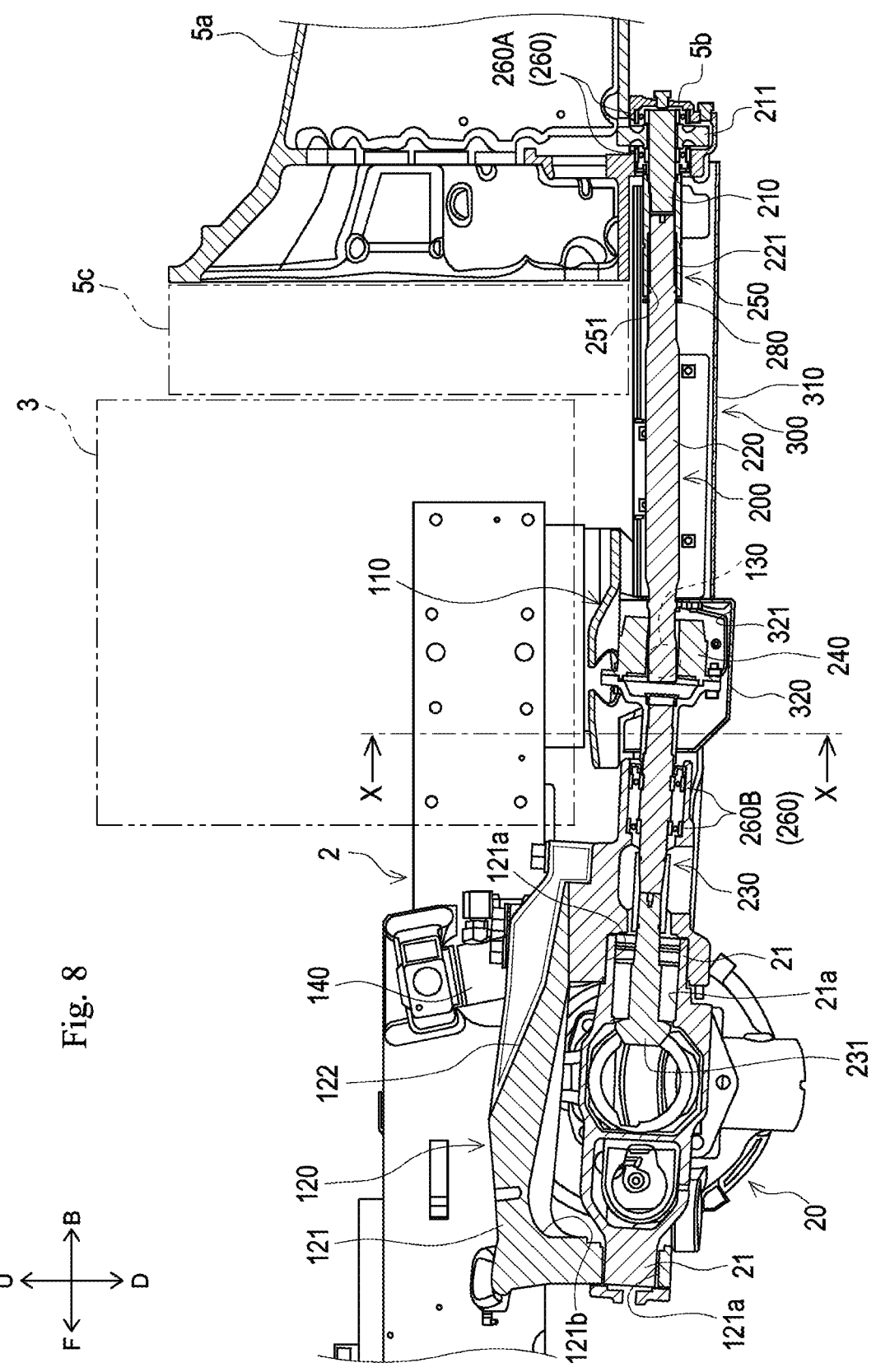
FIG. 8 is a side cross-sectional view illustrating the suspension device and the drive transmission shaft.

The shaft portion 21 illustrated in FIGS. 4 and 8 is a portion protruding forward and rearward at a central portion of the front axle case 20 in the left-right direction. The shaft portion 21 is formed in a substantially cylindrical shape with its axis oriented in the front-rear direction. As illustrated in FIG. 8, an insertion hole 21a that opens rearward and communicates with an internal space is formed in the rear shaft portion 21 of the front and rear shaft portions 21.

The steering device 30 illustrated in FIG. 2 steers the front wheels 6 according to an operation amount of the steering wheel 12. The steering device 30 constitutes a power steering mechanism that assists steering using hydraulic pressure. The steering device 30 includes the steering cylinder 31, a steering valve 32, and a first hose 33.

The steering cylinder 31 illustrated in FIG. 3 changes the turning angle of the front wheels 6 by being operated by the hydraulic pressure of the oil fed by an appropriate pump (not illustrated). The steering cylinder 31 is provided at a front portion of the front axle case 20.

The steering valve 32 feeds oil to the steering cylinder 31 according to the operation amount of the steering wheel 12. The steering valve 32 is provided in an upper portion of the flywheel housing 5c.

The first hose 33 connects the steering cylinder 31 and the steering valve 32. A pair of the first hoses 33 is provided so as to be connected to both left and right sides of the steering cylinder 31.

In the steering device 30 as described above, the oil is fed to the steering cylinder 31 through the first hose 33 by driving the steering valve 32 according to the operation amount of the steering wheel 12, and the steering cylinder 31 is operated by the hydraulic pressure. As a result, the front wheels 6 are steered.

The suspension device 100 illustrated in FIGS. 3 and 4 absorbs vibration transmitted from the front axle case 20 (front wheel 6) to the machine body frame 2. The suspension device 100 rockably supports the front axle case 20 with respect to the machine body frame 2. The suspension device 100 includes a support member 110, a rocking member 120, a rocking shaft 130, a suspension cylinder 140, an accumulator 150, and a second hose 160.

The support member 110 illustrated in FIGS. 4, 5, 8, and 9 is fixed to the machine body frame 2 and supports a rocking shaft 130 which is an axis (an axis oriented in the left-right direction) serving as a rocking center of the front axle case 20.

Figure 12:
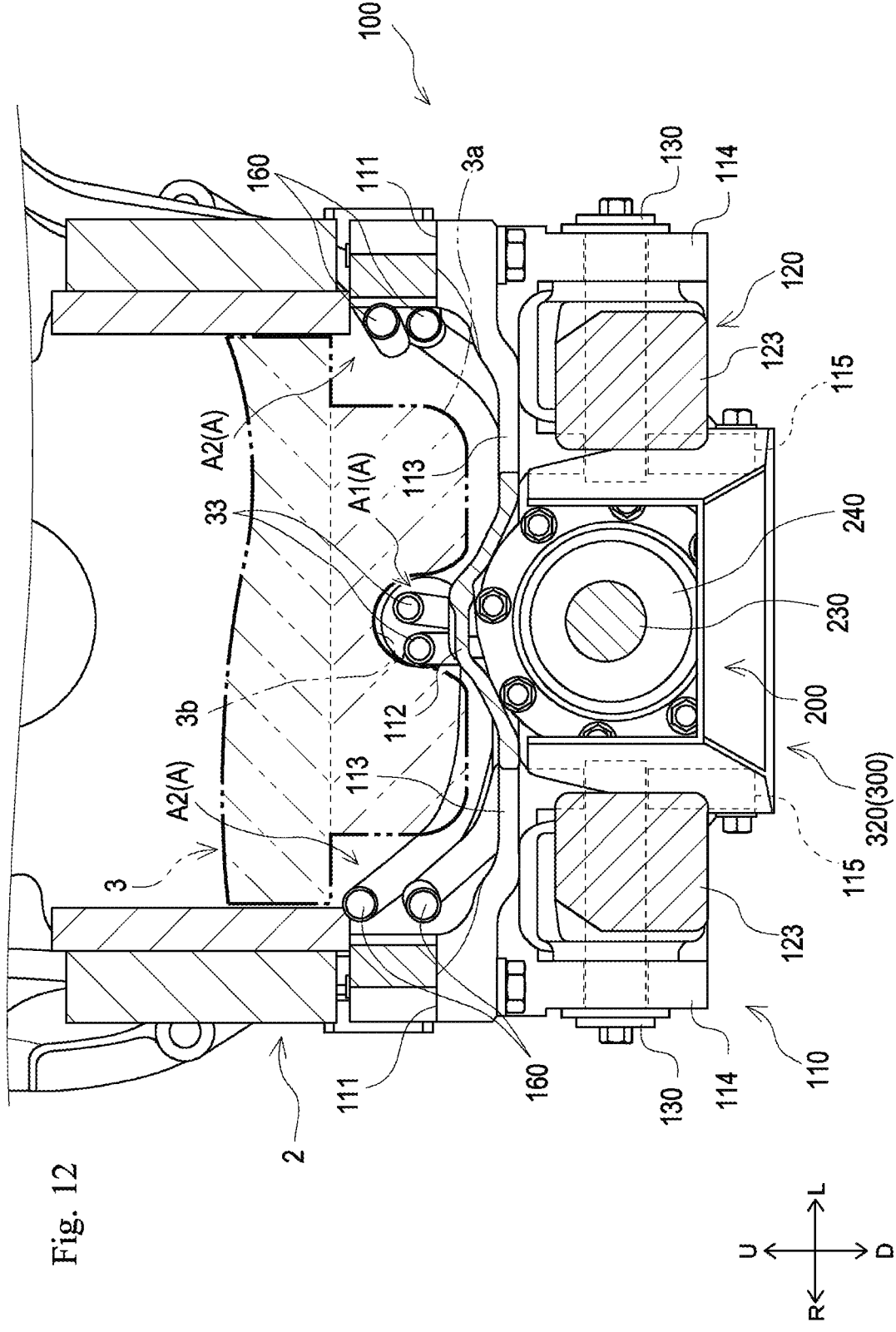
FIG. 12 is a cross-sectional view taken along line X-X in FIG. 8.

The support member 110 is formed in a substantially plate shape with its plate surface oriented in a vertical direction. The support member 110 is formed by casting, for example. As illustrated in FIGS. 8 and 12, the support member 110 is fixed to the lower surface of the machine body frame 2. Accordingly, the support member 110 is disposed so as to be positioned below the engine 3. The support member 110 includes a fixing portion 111, a central portion 112, a recess 113, a first support portion 114, and a second support portion 115.

The fixing portion 111 illustrated in FIG. 5 is a portion fixed to the lower surface of the machine body frame 2. The fixing portion 111 constitutes both end portions of the support member 110 in the left-right direction. A hole through which a stopper for fixing the support member 110 is inserted is formed in the fixing portion 111.

The central portion 112 constitutes a central portion of the support member 110 in the left-right direction. As illustrated in FIG. 12, the height position of the central portion 112 is formed to rise with respect to the periphery so as to be substantially the same as the height position of the fixing portion 111.

The recess 113 is a portion formed to be recessed downward between the left and right fixing portions 111 and the central portion 112. That is, a pair of the recesses 113 is provided so as to be located on both sides of the central portion 112 in the left-right direction. The recess 113 is formed to extend in the front-rear direction.

Figure 9:
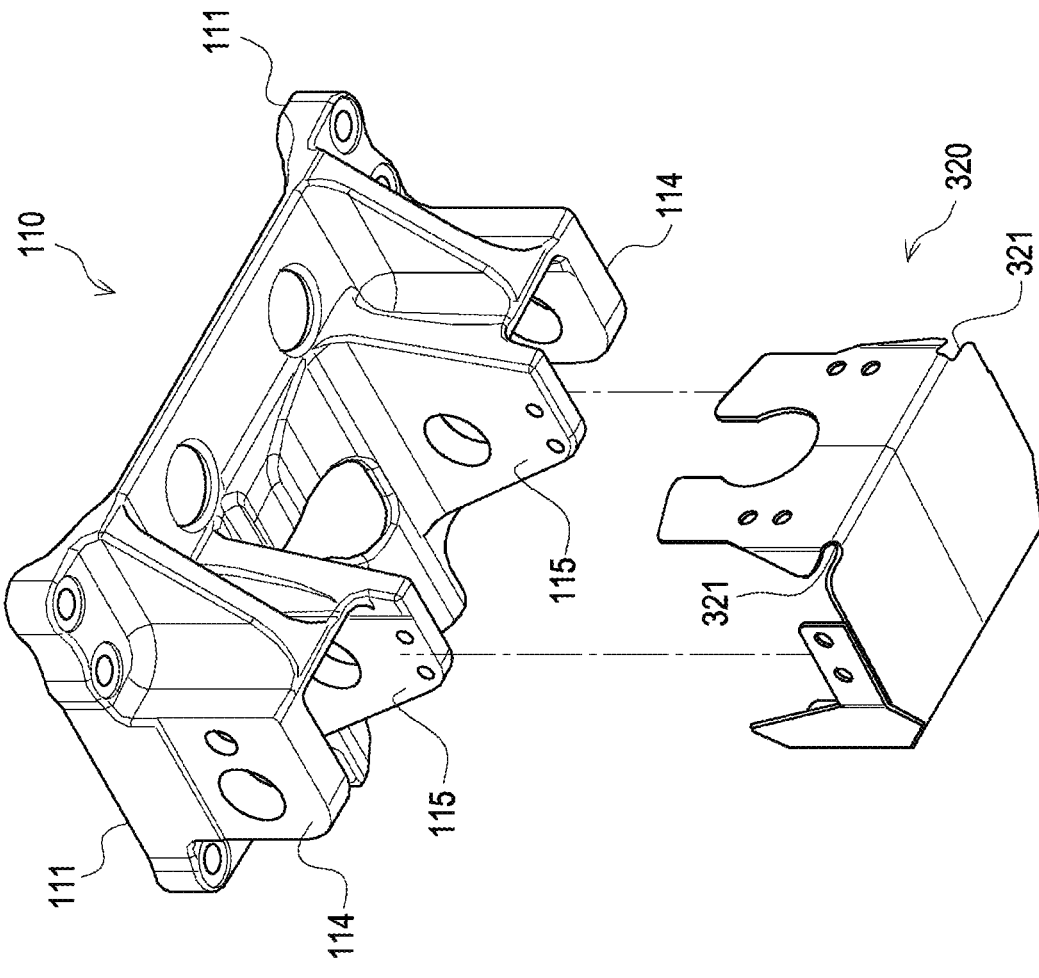
FIG. 9 is an exploded bottom perspective view illustrating the support member and a joint cover.

The first support portion 114 illustrated in FIGS. 5 and 9 is a portion that supports the rocking shaft 130. A pair of the first support portions 114 is formed so as to extend downward from both ends (fixing portions 111) of the support member 110 in the left-right direction. The first support portion 114 is formed in a substantially plate shape with its plate surface oriented in the left-right direction. A hole through which the rocking shaft 130 is inserted is formed in the first support portion 114.

The second support portion 115 is a portion that supports the rocking shaft 130 together with the first support portion 114. The second support portion 115 is disposed on the center side of the support member 110 in the left-right direction at a predetermined interval with respect to the first support portion 114. In the illustrated example, a pair of the second support portions 115 is formed so as to extend downward from the pair of recesses 113. Furthermore, an extension dimension of the second support portion 115 is larger than an extension dimension of the first support portion 114 (see FIG. 12). The second support portion 115 is formed in a substantially plate shape with its plate surface oriented in the left-right direction. A hole through which the rocking shaft 130 is inserted is formed in the second support portion 115.

The rocking member 120 illustrated in FIGS. 4, 6, and 8 supports the front axle case 20 and is rockably supported with respect to the support member 110. The rocking member 120 is molded by casting, for example. The rocking member 120 includes a main body 121, a guide groove portion 122, and a coupling portion 123.

The main body 121 supports the front axle case 20. The main body 121 constitutes a front portion of the rocking member 120. The main body 121 is formed in a shape elongated in the front-rear direction. A through hole 121a penetrating in the front-rear direction is formed in the main body 121. Furthermore, a recess 121b opened (recessed upward) in the left-right direction and downward is formed in a middle portion of the main body 121 in the front-rear direction. As illustrated in FIG. 8, both sides of the recess 121b in the front-rear direction communicate with the through hole 121a.

As illustrated in FIG. 8, the front axle case 20 is disposed inside the recess 121b. In this state, the front and rear shaft portions 21 of the front axle case 20 are respectively inserted into the through holes 121a. Accordingly, the front axle case 20 is supported by the main body 121 (rocking member 120) so as to be rockable about the shaft portion 21.

The guide groove portion 122 is a portion capable of guiding the first hose 33. The guide groove portion 122 is formed on an upper surface of the main body 121 so as to extend in the front-rear direction. The guide groove portion 122 is formed on the center side in the front-rear direction of the main body 121. The guide groove portion 122 is formed such that a groove depth dimension decreases toward the front side.

The coupling portion 123 is a portion coupled to the support member 110 through the rocking shaft 130. The coupling portion 123 constitutes a rear portion of the rocking member 120. A pair of the coupling portions 123 is formed so as to extend from the rear portion of the main body 121 toward both sides (first support portion 114 and second support portion 115) in the left-right direction of the support member 110. Distal end portions of the pair of coupling portions 123 in an extending direction are located in a space between the first support portion 114 and the second support portion 115. A hole through which the rocking shaft 130 is inserted is formed at a distal end portion of the coupling portion 123 in the extending direction.

The rocking shaft 130 illustrated in FIG. 4 is a rocking center of the rocking member 120. The rocking shaft 130 is formed in a substantially cylindrical shape with its axis oriented to the left-right direction. A pair of the rocking shafts 130 is provided so as to couple both sides of the rocking member 120 and the support member 110 in the left-right direction. The rocking shaft 130 is inserted through the coupling portion 123 of the rocking member 120 and the first support portion 114 and the second support portion 115 of the support member 110 to couple the rocking member 120 and the support member 110.

The suspension cylinder 140 absorbs vibration by flow resistance of oil fed by an appropriate pump (not illustrated). The suspension cylinder 140 absorbs the vibration by extending and contracting in the vertical direction. The suspension cylinder 140 is disposed so as to connect the machine body frame 2 and the rocking member 120. Specifically, the upper end side of the suspension cylinder 140 is supported on an inner side surface of the machine body frame 2 about an axis facing the left right direction. Furthermore, the lower end side of the suspension cylinder 140 is supported on a side surface of the main body 121 of the rocking member 120 about the axis facing the left right direction. Furthermore, a pair of the suspension cylinders 140 is disposed so as to connect left and right sides of the machine body frame 2 and the rocking member 120.

The accumulator 150 absorbs vibration of the suspension cylinder 140. The accumulator 150 is provided on the left side in the lower portion of the flywheel housing 5c. Two (a pair of the) accumulators 150 are provided. One accumulator 150 is connected to an oil chamber on the head side of the pair of suspension cylinders 140, and the other accumulator 150 is connected to an oil chamber on the rod side of the pair of suspension cylinders 140.

The second hose 160 connects the pair of suspension cylinders 140 and the pair of accumulators 150. Furthermore, two second hoses 160 are provided for each suspension cylinder 140.

The suspension device 100 as described above supports the front axle case 20 to be rockable about the rocking shaft 130 with respect to the machine body frame 2 through the support member 110 and the rocking member 120. Furthermore, the suspension cylinder 140 interposed between the front axle case 20 side (rocking member 120) and the machine body frame 2 can absorb vibration transmitted from the front axle case 20 (front wheels 6) to the machine body frame 2.

Figure 7:
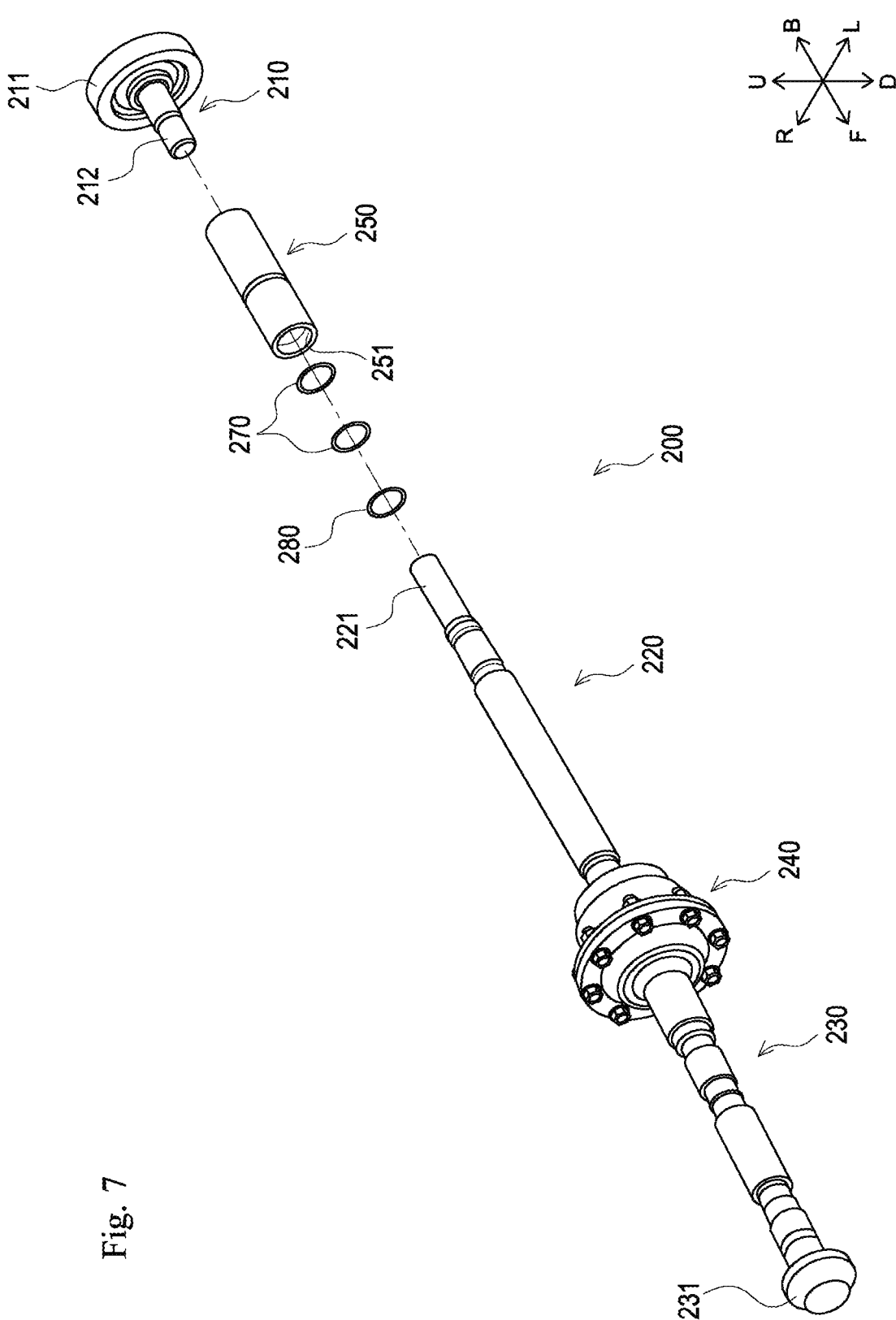
FIG. 7 is an exploded perspective view illustrating the drive transmission shaft.

The drive transmission shaft 200 illustrated in FIGS. 4, 7, and 8 transmits power from the engine 3 (transmission shift device) to the axle in the front axle case 20. As illustrated in FIG. 8, the drive transmission shaft 200 is disposed below the engine 3 and the clutch housing 5a. The drive transmission shaft 200 is formed in a substantially cylindrical shape with its axis oriented substantially in the front-rear direction. The drive transmission shaft 200 includes a first shaft 210, a second shaft 220, a third shaft 230, a constant velocity joint 240, a spline portion 250, a bearing 260, an O-ring 270, and a movement regulation portion 280.

Figure 10:
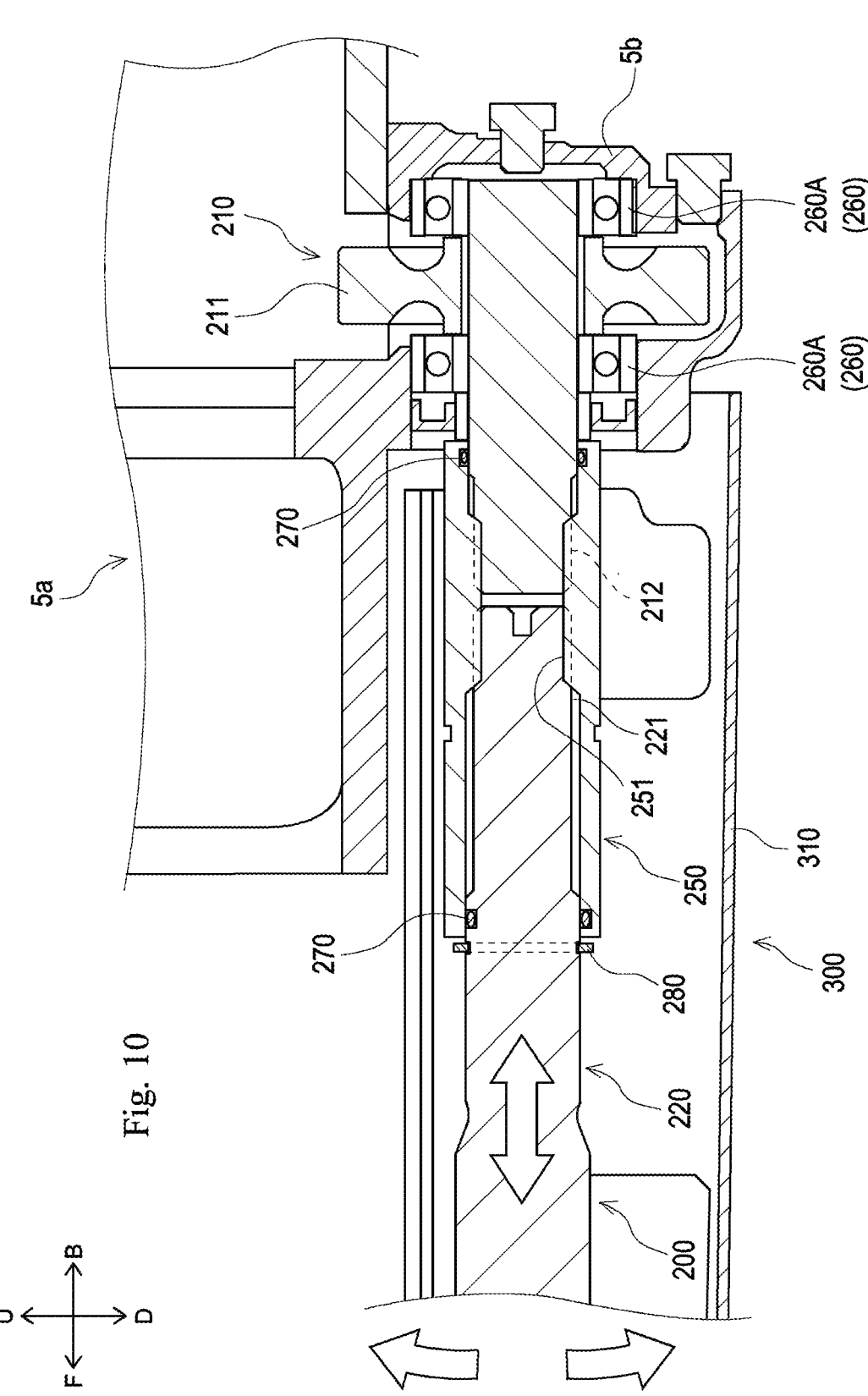
FIG. 10 is an enlarged side cross-sectional view illustrating the drive transmission shaft at a connection position.

The first shaft 210 illustrated in FIGS. 7, 8, and 10 transmits the driving force transmitted from the engine 3 through the transmission shift device. The first shaft 210 constitutes a rear portion of the drive transmission shaft 200. As illustrated in FIGS. 8 and 10, the first shaft 210 is rotatably supported with respect to the clutch housing 5a by the shaft support portion 5b at the lower portion of the clutch housing 5a. The first shaft 210 includes a transmission shift device-side transmission portion 211 and a tooth portion 212.

The transmission shift device-side transmission portion 211 is a portion to which the driving force (rotation) from the power transmission mechanism is transmitted. The transmission shift device-side transmission portion 211 is formed in a shape having an enlarged diameter with respect to the other portion of the first shaft 210. The transmission shift device-side transmission portion 211 is provided at the rear end portion of the first shaft 210. As transmission shift device-side transmission portion 211, a gear or the like engaged with the power transmission mechanism can be employed. As illustrated in FIGS. 8 and 10, the transmission shift device-side transmission portion 211 is housed inside the shaft support portion 5b.

The tooth portion 212 illustrated in FIGS. 7 and 10 is a portion that engages with the spline portion 250 described later. The tooth portion 212 is formed on the outer peripheral surface of the front side portion of the first shaft 210. The tooth portion 212 is formed such that recesses and protrusions are continuous in the circumferential direction by forming a plurality of linear grooves extending in the axial direction at equal intervals in the circumferential direction. Note that illustration of the unevenness is omitted in the drawing example. In the first shaft 210, a portion where the tooth portion 212 is formed is reduced in diameter with respect to other portions.

The driving force from the first shaft 210 is transmitted to the second shaft 220 illustrated in FIGS. 7, 8, and 10. The second shaft 220 is disposed on the front side of the first shaft 210 and constitutes a front-rear intermediate portion of the drive transmission shaft 200. The length dimension of the second shaft 220 is formed to be larger than the length dimension of the first shaft 210. Furthermore, the rear end portion of the second shaft 220 is positioned behind the flywheel housing 5c (see FIG. 8). In the present embodiment, the rear end portion of the second shaft 220 is located at a position overlapping the clutch housing 5a in plan view. The second shaft 220 includes a tooth portion 221.

The tooth portion 221 is a portion that engages with the spline portion 250 described later. The tooth portion 221 is formed on the outer peripheral surface of the rear side portion of the second shaft 220 such that irregularities are continuous in the circumferential direction, substantially similarly to the tooth portion 212. In the second shaft 220, a portion where the tooth portion 221 is formed is reduced in diameter with respect to other portions.

The third shaft 230 illustrated in FIGS. 7 and 8 transmits the driving force transmitted from the second shaft 220 to an axle (not illustrated) of the front wheels 6. The third shaft 230 is disposed on the front side of the second shaft 220 and constitutes the front portion of the drive transmission shaft 200. The length dimension of the third shaft 230 is formed to be smaller than the length dimension of the second shaft 220.

As illustrated in FIG. 8, the third shaft 230 is inserted into the through hole 121a of the rocking member 120 and is rotatably supported with respect to the rocking member 120 (main body 121). Furthermore, the front end portion of the third shaft 230 is inserted into the insertion hole 21a of the front axle case 20. The third shaft 230 includes an axle-side transmission portion 231.

The axle-side transmission portion 231 is a portion that transmits driving force (rotation) to the axle of the front wheel 6. The axle-side transmission portion 231 is provided at a front end portion of the third shaft 230. As illustrated in FIG. 8, the axle-side transmission portion 231 is located in a space inside the front axle case 20. As the axle-side transmission portion 231, a gear (for example, a bevel gear) or the like that engages with the axle can be adopted.

The constant velocity joint 240 illustrated in FIGS. 7 and 8 bendably connects the front end side of the second shaft 220 and the rear end side of the third shaft 230. More specifically, the constant velocity joint 240 transmits torque from the second shaft 220 to the third shaft 230 such that each shaft rotates at a constant velocity even in a case where there is an angle between the second shaft 220 and the third shaft 230.

The constant velocity joint 240 is formed in a shape enlarged in diameter with respect to the second shaft 220 and the third shaft 230. As the constant velocity joint 240, a constant velocity ball joint or the like can be employed. The constant velocity joint 240 is disposed at a position corresponding to the rocking shaft 130. Specifically, the constant velocity joint 240 is disposed such that a bending center portion substantially coincides with (overlaps with) the axial center of the rocking shaft 130 in a side view (see FIG. 8).

The spline portion 250 illustrated in FIGS. 7, 8, and 10 connects the front end side of the first shaft 210 and the rear end side of the second shaft 220 so as to allow relative movement in the axial direction (front-rear direction) of the first shaft 210 and the second shaft 220. The spline portion 250 is formed in a substantially cylindrical shape through which the front end side of the first shaft 210 and the rear end side of the second shaft 220 can be inserted. The inner diameter of the spline portion 250 is formed to have a size corresponding to the outer diameters of the first shaft 210 and the second shaft 220. The spline portion 250 includes a tooth portion 251.

The tooth portion 251 is a portion that engages with the tooth portion 212 of the first shaft 210 and the tooth portion 221 of the second shaft 220. The tooth portion 251 is formed on the inner peripheral surface of the spline portion 250 such that unevenness is continuous in the circumferential direction.

By engaging the tooth portion 251 of the spline portion 250 with the tooth portion 212 of the first shaft 210 and the tooth portion 221 of the second shaft 220 as described above, the first shaft 210 and the second shaft 220 can be connected by the spline structure. According to this, the shafts can be connected so as to allow the relative movement of the first shaft 210 and the second shaft 220 in the axial direction (front-rear direction) and regulate the relative movement in the rotation direction (circumferential direction).

The bearing 260 illustrated in FIGS. 8 and 10 smoothly and rotatably supports each shaft of the drive transmission shaft 200. As the bearing 260, for example, a ball bearing or the like can be adopted. As illustrated in FIG. 8, in the present embodiment, a pair of the bearings 260 (first shaft-side bearings 260A) is provided between the shaft support portion 5*b* of the clutch housing 5*a* and the first shaft 210 at intervals in the front-rear direction. Furthermore, the pair of bearings 260 (third shaft-side bearings 260B) is provided between the through hole 121*a* of the rocking member 120 (main body 121) and the third shaft 230 at intervals in the front-rear direction.

The O-ring 270 illustrated in FIG. 10 closes (seals) a gap between the inner peripheral surface of the spline portion 250 and the outer peripheral surfaces on the front end side of the first shaft 210 and the rear end side of the second shaft 220. The O-ring 270 is formed of a flexible material such as rubber. The O-rings 270 are provided on both sides in the front-rear direction of the inner peripheral surface of the spline portion 250. In the illustrated example, the O-ring 270 on the rear side is provided in a groove formed at the rear end portion of the inner peripheral surface of the spline portion 250, and the O-ring 270 on the front side is provided in a groove formed in the outer peripheral surface of the second shaft 220.

Since the O-ring 270 is provided, leakage of lubricant (grease or the like) sealed between the inner peripheral surface of the spline portion 250 and the outer peripheral surfaces of the first shaft 210 and the second shaft 220 can be suppressed, and the burden of maintenance can be reduced.

The movement regulation portion 280 illustrated in FIGS. 8 and 10 regulates the movement of the spline portion 250 in the axial direction. The movement regulation portion 280 is fixed to the outer peripheral surface of the second shaft 220. In the example illustrated in FIG. 10, the movement regulation portion 280 is engaged with a groove formed on the outer peripheral surface of the second shaft 220 in front of the groove in which the O-ring 270 is provided. For example, a snap ring or the like can be adopted as the movement regulation portion 280. Note that the movement regulation portion 280 is formed to be able to release the engagement with the groove of the outer peripheral surface by being enlarged in diameter. Furthermore, the movement regulation portion 280 can move back and forth on the second shaft 220 in an enlarged diameter state (see FIG. 11).

As illustrated in FIGS. 8 and 10, the spline portion 250 is disposed between the shaft support portion 5*b* of the clutch housing 5*a* and the movement regulation portion 280 to regulate the forward and backward movement. The second shaft 220 to which the movement regulation portion 280 is fixed is regulated from moving backward in a state where the movement regulation portion 280 abuts on the spline portion 250 (see FIGS. 8 and 10). Furthermore, the second shaft 220 is regulated from moving forward in a state where the constant velocity joint 240 connected to the front end side is in contact with the rear end portion (for example, an oil seal provided in the through hole 121*a*) of the main body 121 (rocking member 120) (see FIG. 8). A gap of a certain degree (for example, about 1 mm) is formed between the movement regulation portion 280 and the spline portion 250 and between the main body 121 and the constant velocity joint 240. As described above, the second shaft 220 is connected to the first shaft 210 through the spline portion 250 so as to allow movement in the front-rear direction (axial direction) within the range of the gap.

Figure 11:
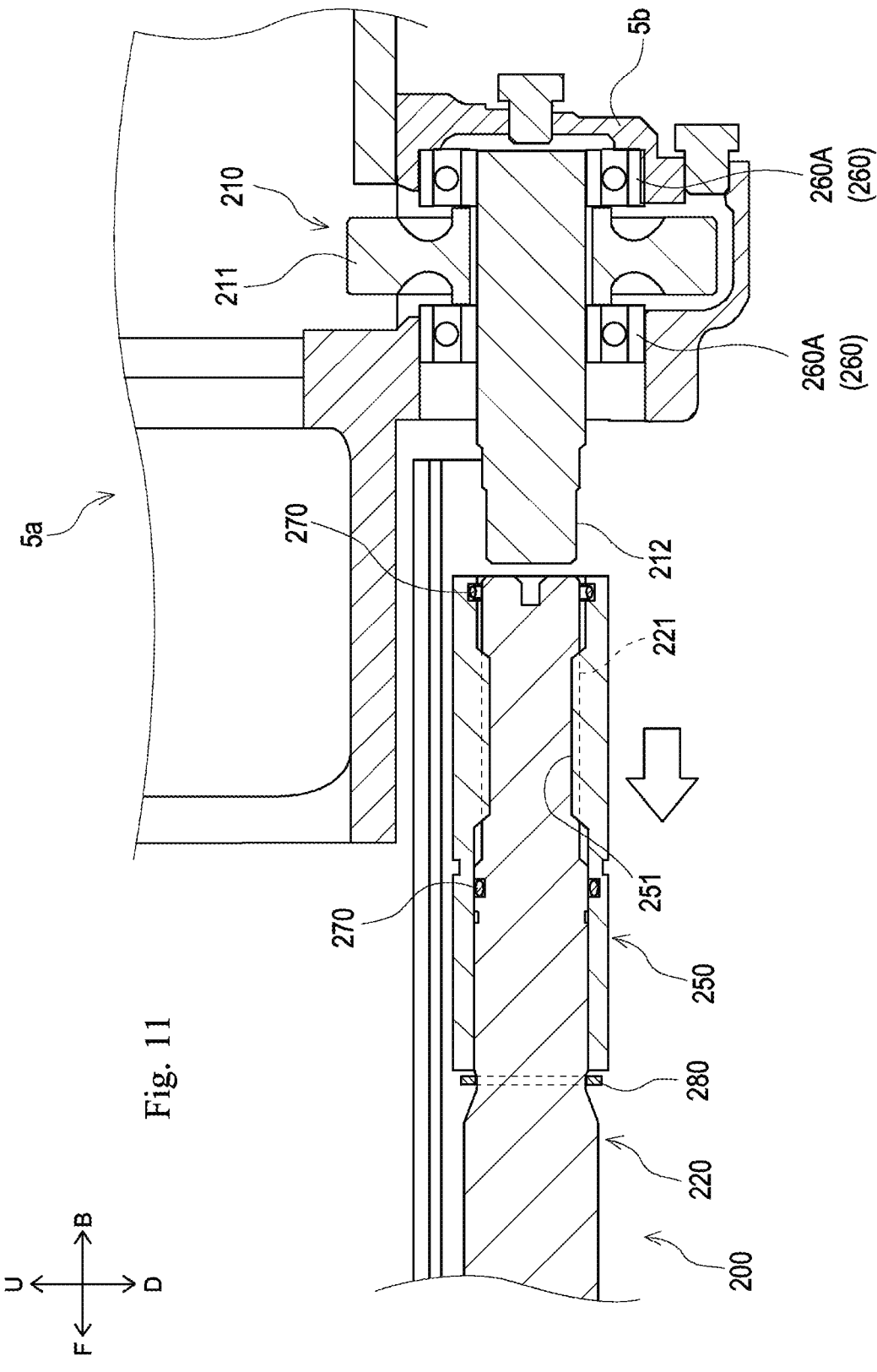
FIG. 11 is an enlarged side cross-sectional view illustrating the drive transmission shaft in a connection release position.

Hereinafter, the position of the spline portion 250 connecting the front end side of the first shaft 210 and the rear end side of the second shaft 220 as described above is referred to as a "connection position" (see FIG. 10). In the present embodiment, the spline portion 250 at the connection position can be moved to the front side (second shaft 220) to be displaced to the "connection release position" where the connection to the first shaft 210 is released (see FIG. 11). In this case, the movement regulation portion 280 is moved forward so as to allow the spline portion 250 to move forward. As illustrated in FIG. 11, the movement regulation portion 280 that has moved forward is disposed so as to be accommodated in a portion recessed (narrowed) on the outer peripheral surface of the second shaft 220. Note that at this time, a shaft cover portion 310 to be described later is removed.

FIG. 11 illustrates a state in which the spline portion 250 is located at the connection release position. At the connection release position, the rear end portion of the second shaft 220 and the rear end portion of the spline portion 250 are substantially aligned in the front-rear direction. In this state, the second shaft 220 is bent with respect to the third shaft 230 through the constant velocity joint 240 and the second shaft 220 is lowered, so that the second shaft 220 can be easily removed with respect to the first shaft 210. Furthermore, contrary to the above operation, the second shaft 220 can be easily assembled to the first shaft 210 by raising the second shaft 220 to the position of the first shaft 210 and moving the spline portion 250 to the connection position.

The cover member 300 illustrated in FIG. 8 covers the drive transmission shaft 200 from below. The cover member 300 is formed by appropriately bending a metal plate. The cover member 300 is disposed so as to bridge over the shaft support portion 5*b* of the clutch housing 5*a* and the support member 110. The cover member 300 includes the shaft cover portion 310 and a joint cover portion 320.

The shaft cover portion 310 covers the first shaft 210, the second shaft 220, and the spline portion 250 of the drive transmission shaft 200. More specifically, the shaft cover portion 310 covers both left and right sides and a lower side of the first shaft 210, the second shaft 220, and the spline portion 250. The shaft cover portion 310 is formed in a substantially box shape elongated in the front-rear direction. A rear end portion of the shaft cover portion 310 is fixed to the shaft support portion 5b.

The joint cover portion 320 illustrated in FIGS. 8, 9, and 12 covers the constant velocity joint 240. More specifically, as illustrated in FIGS. 8 and 9, the joint cover portion 320 covers both left and right sides and a lower side of the constant velocity joint 240. A rear end portion of the joint cover portion 320 is fixed to the shaft cover portion 310. Furthermore, both left and right side portions of the joint cover portion 320 are fixed to the second support portion 115 of the support member 110 (see FIG. 9).

An opening portion 321 that opens in the left right direction and communicates with the inside of the joint cover portion 320 is formed on a side surface of the joint cover portion 320. The opening portion 321 is formed at a corner portion on the rear lower side of the side surface of the joint cover portion 320. Foreign matter (for example, mud, water, or the like) that has entered the inside of the joint cover portion 320 can be discharged through the opening portion 321.

Since the constant velocity joint 240 is provided on the drive transmission shaft 200, the tractor 1 as described above can bend the drive transmission shaft 130 so as to follow the operation of the suspension device 100 (rocking about the rocking shaft 200) (see FIG. 8).

Here, in a case where an assembling error or the like of the constant velocity joint 240 occurs and a portion that becomes a center of bending of the constant velocity joint 240 does not coincide with an axial center of the rocking shaft 130 in a side view, there is a possibility that the drive transmission shaft 200 cannot follow the operation of the suspension device 100.

Therefore, in the present embodiment, the first shaft 210 and the second shaft 220 are connected by a spline structure using the spline portion 250 in addition to the constant velocity joint 240. As a result, as illustrated in FIG. 10, since the relative movement of the first shaft 210 and the second shaft 220 in the axial direction is allowed, an assembling error of the constant velocity joint 240 can be absorbed.

Furthermore, in a case where the first shaft 210 and the second shaft 220 are connected by the spline structure as in the present embodiment, a certain degree of gap formed between the outer peripheral surface of the second shaft 220 and the inner peripheral surface of the spline portion 250 allows radial displacement (movement in the vertical direction, etc.) of the second shaft 220 with respect to the spline portion 250 (backlash occurs). In the present embodiment, since the second shaft 220 is formed to be relatively long, the displacement amount on the front end side (constant velocity joint 240 side) of the second shaft 220 according to the displacement amount of the backlash of the spline portion 250 can be increased. As a result, an assembling error of the constant velocity joint 240 can be more effectively absorbed.

As described above, in the present embodiment, by adopting the connection between the first shaft 210 and the second shaft 220 by the spline structure, the assembly error in the axial direction and the radial direction of the drive transmission shaft 200 can be absorbed. Furthermore, according to the above configuration, for example, unlike the case where the drive transmission shaft 200 is provided with the other constant velocity joint 240 in order to absorb the assembly error, space saving can be achieved below the vehicle body. This makes it possible to secure the minimum ground level of the vehicle body.

Furthermore, the tractor 1 as described above can suitably route the hoses (the first hose 33 and the second hose 160) for operating the steering device 30 and the suspension device 100. How the hoses are routed will be described below.

In the present embodiment, as illustrated in FIG. 12, a routing space A in which the hoses (the first hose 33 and the second hose 160) can be routed is formed between the engine 3 and the support member 110. The routing space A includes a first routing space A1 and a second routing space A2.

The first routing space A1 is a space in which the first hose 33 of the steering device 30 is routed. The first routing space A1 is defined by the recess 3b of the engine 3 and the central portion 112 of the support member 110. The first routing space A1 is formed to extend in the front-rear direction.

The first hose 33 connected to the steering valve 32 behind the engine 3 passes through the first routing space A1. The first hose 33 is disposed so as to extend over the central portion 112 of the support member 110 in the front-rear direction (see FIG. 3). In the present embodiment, the first hose 33 having passed through the first routing space A1 is guided to the front side along the guide groove portion 122 of the rocking member 120 and is connected to the steering cylinder 31.

The second routing space A2 is a space in which the second hose 160 is routed. The second routing space A2 is defined by left and right side surfaces of the engine 3 (oil pan 3a), an inner surface of the machine body frame 2 facing the side surfaces, and the pair of recesses 113 of the support member 110. A pair of the second routing spaces A2 is formed so as to be positioned on both sides of the first routing space A1 in the left right direction. The second routing space A2 is formed to extend in the front-rear direction.

The left and right second hoses 160 connected to the accumulator 150 behind the engine 3 pass through the left and right second routing spaces A2 and are connected to the left and right suspension cylinders 140 (see FIG. 3).

As described above, in the present embodiment, the first hose 33 and the second hose 160 can be routed using the routing space A formed between the engine 3 and the support member 110. Furthermore, the number of members can be reduced by using the support member 110 of the suspension device 100 as a member for guiding the first hose 33 and the second hose 160. Furthermore, since the support member 110 is interposed between each hose and the drive transmission shaft 200 (the constant velocity joint 240 and the like), it is possible to prevent each hose from directly contacting the drive transmission shaft 200 rotating at a high speed.

Here, the tractor 1 adopts a specification in which the suspension device 100 is provided, but a case of adopting a specification in which the suspension device 100 is not provided is also assumed. In a case where the suspension device 100 is not provided, a mechanism for vertically rocking the drive transmission shaft 200 becomes unnecessary, and the drive transmission shaft 200 can be disposed at a high position. In this case, the drive transmission shaft 200 can be disposed in place of the first hose 33 in the recess 3b (first routing space A1) of the oil pan 3a of the engine 3. As described above, in the present embodiment, the engine 3 has high versatility.

In the present embodiment, the first hose 33 can be routed using the recess 3b of the engine 3 as described above. Furthermore, it is assumed that the first hose 33 operates up and down and right and left in conjunction with the operation of the front axle case. According to the present embodiment, it is possible to stably route the first hose 33 using the first routing space A1 on the center side in the left-right direction of the vehicle body and the guide groove portion 122.

Furthermore, in the present embodiment, the second hoses 160 of the suspension cylinders 140 disposed on the left and right sides of the vehicle body can be suitably routed using the second routing spaces A2 formed on the left and right sides of the first hose 33.

As described above, the tractor 1 (working vehicle) according to the present embodiment includes:

the machine body frame 2 to which the engine 3 is fixed;

the front axle case 20 that supports an axle of the front wheels 6;

the suspension device 100 that supports the front axle case 20 so as to be rockable about the rocking shaft 130 with respect to the machine body frame 2;

the first shaft 210 that is disposed below a first case (the clutch housing 5a) in which a transmission shift device is accommodated and to which a driving force transmitted from the engine 3 through the transmission shift device is transmitted;

the second shaft 220 that is disposed on the front side of the first shaft 210 and to which a driving force from the first shaft 210 is transmitted;

the third shaft 230 that is disposed on the front side of the second shaft 220 and transmits a driving force transmitted from the second shaft 220 to the axle; the constant velocity joint 240 that bendably connects a front end side of the second shaft 220 and a rear end side of the third shaft 230 at a position corresponding to the rocking shaft 130; and a connection portion (the spline portion 250) that connects a rear end side of the second shaft 220 and a front end side of the first shaft 210 so as to allow relative movement of the second shaft 220 and the first shaft 210 in an axial direction.

With such a configuration, an assembling error of the constant velocity joint 240 can be absorbed, and space saving can be achieved. That is, in a case where the suspension device 100 that supports the front axle case 20 so as to be rockable about the rocking shaft 130 is provided, it is necessary to provide the constant velocity joint 240 bendable at a position corresponding to the rocking shaft 130 on the shaft and bend the shaft following the operation of the suspension device 100. Here, in a case where an assembling error of the constant velocity joint 240 occurs, the shaft may not follow the operation of the suspension device 100. In the tractor 1 (working vehicle) according to the present embodiment, in addition to the constant velocity joint 240, the first shaft 210 and the second shaft 220 are connected by the connection portion (spline portion 250) that allows the relative movement of the first shaft 210 and the second shaft 220 in the axial direction, so that an assembling error of the constant velocity joint 240 can be absorbed. Furthermore, in a case where the connection by the connection portion (spline portion 250) is adopted, space saving under the vehicle body can be achieved unlike the case where another constant velocity joint 240 is provided to absorb the assembling error. This makes it possible to secure the minimum ground level of the vehicle body.

Furthermore, a rear end portion of the second shaft 220 is disposed between the engine 3 and the first case (clutch housing 5a), and is located behind a second case (flywheel housing 5c) that accommodates a flywheel.

With such a configuration, an assembling error of the constant velocity joint 240 can be more effectively absorbed. That is, in a case where the connection by the connection portion (spline portion 250) is adopted, the radial displacement (movement in the vertical direction, etc.) of the second shaft 220 with respect to the connection portion (spline portion 250) is allowed (backlash occurs) by a certain degree of gap formed between the second shaft 220 and the connection portion (spline portion 250). In the present embodiment, the rear end portion of the second shaft 220 is located behind the flywheel housing 5c, so that the length dimension of the second shaft 220 is formed to be relatively large. As described above, since the second shaft 220 is formed to be relatively long, it is possible to increase a displacement amount on the front end side (constant velocity joint 240 side) of the second shaft 220 according to a displacement amount of the backlash of the connection portion (spline portion 250). As a result, an assembling error of the constant velocity joint 240 can be more effectively absorbed.

Furthermore, the connection portion (spline portion 250) can be displaced to a connection position at which the rear end side of the second shaft 220 and the front end side of the first shaft 210 are connected, and a connection release position at which the connection portion moves from the connection position to the first shaft 210 side or the second shaft 220 side and releases the connection between the first shaft 210 and the second shaft 220.

With this configuration, assemblability can be improved. That is, by setting the connection portion (spline portion 250) at the connection release position, the second shaft 220 can be easily attached to and detached from the first shaft 210, and the assemblability can be improved.

Furthermore, the connection portion (spline portion 250) connects the second shaft 220 and the first shaft 210 by a spline structure in which a first engaging portion (the tooth portion 251) formed on an inner peripheral surface is engaged with a second engaging portion (the tooth portion 212, the tooth portion 221) formed on outer peripheral surfaces on the rear end side of the second shaft 220 and the front end side of the first shaft 210.

With such a configuration, since the second shaft 220 and the first shaft 210 are connected by the spline structure, an assembling error of the constant velocity joint 240 can be more effectively absorbed.

Furthermore, on both sides in the front-rear direction of the inner peripheral surface of the connection portion (spline portion 250), a closing portion (the O-ring 270) that closes a gap between the inner peripheral surface and the outer peripheral surfaces on the rear end side of the second shaft 220 and the front end side of the first shaft 210 is provided.

With such a configuration, maintainability can be improved. That is, leakage of lubricant (grease or the like) sealed between the inner peripheral surface of the connection portion (spline portion 250) and the outer peripheral surfaces of the second shaft 220 and the first shaft 210 can be suppressed, and a burden of maintenance can be reduced.

Furthermore, further included is a cover portion (the joint cover portion 320) that covers the constant velocity joint 240 from below and is formed with a discharge portion (the opening portion 321) through which foreign matter entering an inside can be discharged.

With such a configuration, even in a case where foreign matter enters the inside of the cover portion (joint cover portion 320), the foreign matter can be discharged.

Furthermore, the tractor 1 (working vehicle) according to the present embodiment includes:

the machine body frame 2 to which the engine 3 is fixed;

the front axle case 20 that supports an axle of a front wheel and is rockable about the rocking shaft 130;

a buffer device (the suspension device 100) that absorbs vibration transmitted from the front axle case 20 to the machine body frame 2; and the support member 110 that is fixed to the machine body frame 2 so as to be located below the engine 3, supports the rocking shaft 130, and defines the routing space A in which a linear member (the first hose 33, the second hose 160) extending in a front-rear direction can be routed between the support member and the engine 3.

With such a configuration, the routing of the linear member (first hose 33, second hose 160) can be suitably performed. That is, it is possible to route the linear member (first hose 33, second hose 160) using the routing space A formed between the engine 3 and the support member 110. Furthermore, the number of members can be reduced by using the support member 110 that supports the rocking shaft 130 as a member that guides the linear member (first hose 33, second hose 160).

Furthermore, the engine 3 includes the recess 3b formed on a lower surface so as to extend in the front-rear direction, and the routing space A includes a first routing space A1 defined by the recess 3b and the support member 110.

With this configuration, the linear member (first hose 33) can be routed using the recess 3b formed on the lower surface of the engine 3. Furthermore, the recess 3b (first routing space A1) can also be used as a space for disposing the drive transmission shaft 200 according to the model, type, or the like of the tractor (working vehicle).

Furthermore, the linear member (first hose 33, second hose 160) includes the first hose 33 connected to a steering cylinder provided in the front axle case 20 from the rear side of the engine 3, and the first hose 33 is routed in the first routing space A1.

With such a configuration, the routing of the first hose 33 can be suitably performed. By routing the first hose 33 in the first routing space A1 formed by the recess 3b, it is possible to stably route the first hose 33 that moves up and down in conjunction with the operation of the front axle case 20.

Furthermore, the routing space A includes the second routing space A2 defined by a side surface of the engine 3, an inner surface of the machine body frame 2 facing the side surface, and the support member 110.

With such a configuration, the linear member (second hose 160) can be routed using the second routing space A2 formed on the side of the engine 3.

Furthermore, the buffer device (suspension device 100) includes a buffer cylinder (the suspension cylinder 140), the linear member (first hose 33, second hose 160) includes the second hose 160 connected to the buffer cylinder (suspension cylinder 140) from the rear side of the engine 3, and the second hose 160 is routed in the second routing space A2.

With such a configuration, the routing of the second hose 160 can be suitably performed. That is, the second hose 160 can be routed using the second routing space A2 located on the side of the engine 3.

Furthermore, the rocking member 120 to which the front axle case 20 is fixed and that is supported so as to be rockable about the rocking shaft 130 with respect to the support member 110 is included, and the rocking member 120 includes the guide groove portion 122 formed on an upper surface so as to extend in the front-rear direction and capable of guiding the linear member (first hose 33, second hose 160).

With such a configuration, the linear member (first hose 33, second hose 160) can be routed using the guide groove portion 122 formed on the upper surface of the rocking member 120.

Furthermore, the drive transmission shaft 200 that transmits a driving force from the engine 3 to the axle is disposed below the support member 110.

With such a configuration, the linear member (first hose 33, second hose 160) can be protected. That is, by interposing the support member 110 between the drive transmission shaft 200 and the linear member (first hose 33, second hose 160), the drive transmission shaft 200 rotating at a high speed and the linear member (first hose 33, second hose 160) can be prevented from coming into direct contact with each other.

Furthermore, a cover portion (the joint cover portion 320) that is fixed to the support member 110 and covers the drive transmission shaft 200 from below is included.

With such a configuration, the cover portion (joint cover portion 320) covering the drive transmission shaft 200 can be fixed using the support member 110.

Note that the tractor 1 according to the present embodiment is one form of a working vehicle according to the present invention.

Furthermore, the clutch housing 5a according to the present embodiment is one form of a first case according to the present invention.

Furthermore, the flywheel housing 5c according to the present embodiment is one form of a second case according to the present invention.

Furthermore, the spline portion 250 according to the present embodiment is one form of a connection portion according to the present invention.

Furthermore, the tooth portion 251 according to the present embodiment is one form of a first engaging portion according to the present invention.

Furthermore, the tooth portion 212 and the tooth portion 221 according to the present embodiment are one form of a second engaging portion according to the present invention.

Furthermore, the O-ring 270 according to the present embodiment is one form of a closing portion according to the present invention.

Furthermore, the joint cover portion 320 according to the present embodiment is one form of a cover portion according to the present invention.

Furthermore, the suspension device 100 according to the present embodiment is one form of a buffer device according to the present invention.

Furthermore, the first hose 33 and the second hose 160 according to the present embodiment are one form of a linear member according to the present invention.

Furthermore, the suspension cylinder 140 according to the present embodiment is one form of a buffer cylinder according to the present invention.

Furthermore, the opening portion 321 according to the present embodiment is one form of a discharge portion according to the present invention.

Although one embodiment of the present invention has been described above, the present invention is not limited to the above configurations, and various modifications can be made within the scope of the invention described in the claims.

For example, the shape and the like of each member (support member 110, rocking member 120, drive transmission shaft 200, or the like) described in the above embodiment are merely examples, and are not limited to the above-described shape and the like. The shape and the like of each member can be changed to any shape.

Furthermore, in the above embodiment, the example in which the rear end portion of the second shaft 220 is located behind the flywheel housing 5c has been described, but the present invention is not limited to such an aspect. For example, the rear end portion of the second shaft 220 may be located at a position corresponding to the flywheel housing 5c (overlapping the flywheel housing 5c in plan view).

Furthermore, in the above embodiment, the transmission case 5, the clutch housing 5a, the flywheel housing 5c, and the like are exemplified as members that accommodate the power transmission mechanism that transmits power from the engine 3, but the present invention is not limited to such an aspect. For example, the transmission case 5 and the like can be integrally formed or further divided.

Furthermore, in the above embodiment, the example in which the spline portion 250 is moved forward (toward the second shaft 220) when the connection between the first shaft 210 and the second shaft 220 is released has been described. However, the present invention is not limited to such an aspect. For example, the connection between the shafts may be released by moving the spline portion 250 to the rear side (the first shaft 210 side). In this case, the length dimension and the like of the first shaft 210 are appropriately set so that the spline portion 250 can be moved to the rear side. Specifically, the length dimensions of the first shaft 210 and the spline portion 250 can be set so as to secure a moving distance of the spline portion 250.

Furthermore, in the above embodiment, the example in which the spline portion 250 is movable between the connection position and the connection release position has been described. However, the present invention is not limited to such an aspect, and for example, the above movement may be disabled.

Furthermore, in the above embodiment, the example in which the pair of second routing spaces A2 is provided on the left and right has been described, but the present invention is not limited to such an aspect, and for example, one second routing space A2 may be provided.

Furthermore, in the above embodiment, the example in which the guide groove portion 122 is provided in the rocking member 120 has been described, but the present invention is not limited to such an aspect, and for example, the guide groove portion 122 may not be provided.

Furthermore, in the above embodiment, the example in which the hoses (the first hose 33 and the second hose 160) connected to the cylinder are routed using the routing space A has been described, but the present invention is not limited to such an aspect. For example, other linear members such as a harness and a wire may be routed in the routing space A.

Furthermore, in the above embodiment, the tractor 1 has been exemplified as the working vehicle, but the working vehicle is not limited to such an aspect. For example, the working vehicle may be other agricultural vehicles, construction vehicles, industrial vehicles, or the like.

INDUSTRIAL APPLICABILITY

The present invention can be applied to a working vehicle.

REFERENCE SIGNS LIST

1: Tractor
20: Front axle case
100: Suspension device
200: Drive transmission shaft
300: Cover member

The invention claimed is:

1. A working vehicle comprising:
a machine body frame to which an engine is fixed;
a front axle case that supports an axle of a front wheel and is rockable about a rocking shaft;
a buffer device that absorbs vibration transmitted from the front axle case to the machine body frame; and
a support member that is fixed to the machine body frame so as to be located below the engine, supports the rocking shaft, and defines a routing space in which a linear member extending in a front-rear direction can be routed between the support member and the engine.

2. The working vehicle according to claim 1, wherein the engine includes
a recess formed in a lower surface so as to extend in the front-rear direction, and the routing space includes
a first routing space defined by the recess and the support member.

3. The working vehicle according to claim 2, wherein the linear member includes
a first hose connected to a steering cylinder provided in the front axle case from a rear side of the engine, and the first hose is routed in the first routing space.

4. The working vehicle according to claim 2, wherein a drive transmission shaft that transmits a driving force from the engine to the axle is disposed below the support member.

5. The working vehicle according to claim 4, further comprising
a cover portion fixed to the support member and covering the drive transmission shaft from below.

6. The working vehicle according to claim 3, wherein a drive transmission shaft that transmits a driving force from the engine to the axle is disposed below the support member.

7. The working vehicle according to claim 6, further comprising
a cover portion fixed to the support member and covering the drive transmission shaft from below.

8. The working vehicle according to claim 1, wherein the routing space includes
a second routing space defined by a side surface of the engine, an inner surface of the machine body frame facing the side surface, and the support member.

9. The working vehicle according to claim 8, wherein the buffer device includes
a buffer cylinder,
the linear member includes
a second hose connected to the buffer cylinder from a rear side of the engine, and
the second hose is routed in the second routing space.

10. The working vehicle according to claim 9, wherein a drive transmission shaft that transmits a driving force from the engine to the axle is disposed below the support member.

11. The working vehicle according to claim 10, further comprising a cover portion fixed to the support member and covering the drive transmission shaft from below.

12. The working vehicle according to claim 8, wherein a drive transmission shaft that transmits a driving force from the engine to the axle is disposed below the support member.

13. The working vehicle according to claim 12, further comprising a cover portion fixed to the support member and covering the drive transmission shaft from below.

14. The working vehicle according to claim 1, further comprising a rocking member to which the front axle case is fixed, the rocking member being supported to be rockable about the rocking shaft with respect to the support member, wherein the rocking member includes a guide groove portion formed on an upper surface so as to extend in the front-rear direction, the guide groove portion being capable of guiding the linear member.

15. The working vehicle according to claim 14, wherein a drive transmission shaft that transmits a driving force from the engine to the axle is disposed below the support member.

16. The working vehicle according to claim 15, further comprising a cover portion fixed to the support member and covering the drive transmission shaft from below.

17. The working vehicle according to claim 1, wherein a drive transmission shaft that transmits a driving force from the engine to the axle is disposed below the support member.

18. The working vehicle according to claim 17, further comprising a cover portion fixed to the support member and covering the drive transmission shaft from below.

* * * * *